(12) United States Patent
Wang

(10) Patent No.: US 9,794,995 B1
(45) Date of Patent: Oct. 17, 2017

(54) LED LAMP ARRANGEMENT ADAPTED TO REPLACE FLUORESCENT LAMP IN LUMINAIRE WITH BALLAST

(71) Applicant: Analog Integrations Corporation, Hsin-Chu (TW)

(72) Inventor: Jing-Chyi Wang, Hsin-Chu (TW)

(73) Assignee: Analog Integrations Corporation, Hsin-Chu (TW)

( * ) Notice: Subject to any disclaimer, the term of this patent is extended or adjusted under 35 U.S.C. 154(b) by 0 days.

(21) Appl. No.: 15/260,333

(22) Filed: Sep. 9, 2016

(51) Int. Cl.
*H05B 33/08* (2006.01)
*F21K 9/232* (2016.01)

(52) U.S. Cl.
CPC ......... *H05B 33/0845* (2013.01); *F21K 9/232* (2016.08); *H05B 33/089* (2013.01); *H05B 33/0815* (2013.01); *H05B 33/0887* (2013.01)

(58) Field of Classification Search
CPC .............. H05B 33/0845; H05B 33/089; H05B 33/0887; H05B 33/0815; F21K 9/232
USPC ........................................................ 315/201
See application file for complete search history.

(56) References Cited

U.S. PATENT DOCUMENTS

| | | | | |
|---|---|---|---|---|
| 2012/0081035 A1* | 4/2012 | McCune, Jr. | ...... | H05B 33/0815 315/297 |
| 2013/0307428 A1* | 11/2013 | Hattrup | ............. | H05B 33/0812 315/201 |
| 2014/0203717 A1* | 7/2014 | Zhang | ................ | H05B 33/0809 315/188 |
| 2015/0130363 A1* | 5/2015 | Lee | .................... | H05B 33/0845 315/201 |

\* cited by examiner

*Primary Examiner* — Alexander H Taningco
*Assistant Examiner* — Renan Luque
(74) *Attorney, Agent, or Firm* — Winston Hsu

(57) ABSTRACT

An LED lamp arrangement is disclosed to replace a fluorescent lamp in a luminaire with a ballast. The LED lamp arrangement has a rectifier, LEDs, a LED driver, an impedance balance circuit, a line-voltage controller. The rectifier has two inputs connected to the ballast to provide a rectified power line and a ground power line. The LEDs and a LED driver are connected in series between the rectified power line and the ground power line, and the LED driver regulates a LED driving current through the LEDs. The impedance balance circuit is coupled between the inputs. The line-voltage controller controls the impedance balance circuit in response to a line voltage at the rectified power line, so as to tune an impedance between the inputs and make the line voltage approach to a predetermined target voltage.

14 Claims, 5 Drawing Sheets

LED LAMP ARRANGEMENT ADAPTED TO REPLACE FLUORESCENT LAMP IN LUMINAIRE WITH BALLAST

BACKGROUND OF THE INVENTION

1. Field of the Invention

The present disclosure relates generally to Light-Emitting Diode (LED) lamps, and more particularly to LED lamps suitable to replace a fluorescent lamp in a luminaire with a ballast for use with fluorescent lamps.

2. Description of the Prior Art

Fluorescent lighting has been around for many years, starting out as a highly efficient alternative for incandescent light bulbs. Nevertheless, it has recently been surpassed by LED lighting to some extent in terms of efficiency and power consumption.

Fluorescent lamps generally comprise a straight or curved tube with an inert gas and a small amount of mercury, capped at both ends with double-pined end caps. These end caps contain a glow wire to preheat the gases inside the tube and to vaporize the mercury in order to assist with ignition of the fluorescent lamp. Once the fluorescent is ignited, heat generated by the conducted current keeps the fluorescent lamp in operational condition. To facilitate these starting conditions and to limit the conducted current during operation, a ballast is connected between the mains power supply and the fluorescent lamp, and power is supplied to the fluorescent lamp via the ballast.

One type of ballasts is referred to as magnetic ballasts, and they simply have inductive elements placed in series with the mains power supply to the fluorescent lamp. As an inductive element has frequency dependent impedance, it can limit the AC current flowing through the fluorescent lamp, in expense of a relatively low power factor. Some magnetic ballasts might need an additional starter to initially vaporize the mercury in the tube.

Another type of ballasts is called as electronic ballasts. Normally, electronic ballasts convert AC mains power into DC power, and sequentially convert the DC power into high frequency AC power to drive the fluorescent lamp. Electronic ballasts could actively control the amplitude and the frequency of the AC current through the fluorescent lamp, and allow the system to have a power factor close to a value of one. Some advanced electronic ballasts could check the existence of the fluorescent lamp, power conversion of the electronic ballasts is stopped to save power if the fluorescent lamp is absent, and this function is referred to as open circuit protection. Another function is called as short circuit protection, where an electronic ballast stops the power conversion if the end caps of the fluorescent lamp are deemed to accidentally short to each other.

LED lighting has many advantages over the fluorescent lighting. For example, no mercury is required for LED lighting, the lifespan of LEDs is greatly increased over fluorescent lighting, and driving LEDs needs only DC current, which is easy to generate and regulate.

Thus, replacing existing fluorescent lighting systems with LED lighting systems is often desired. Replacement LED lamps lacking appropriate circuit to deal with the ballast cannot be inserted directly in luminaires designed for fluorescent lamps due to the ballasts. One choice is to replace the whole existing luminaire for fluorescent lamps with a new luminaire specifically designed for LED lamps, but the cost for this replacement could be scary. As a consequence, many users just replace failed fluorescent lamps with new fluorescent lamps, even in view of the advantages of LED lamps.

Therefore, there is a need for an LED lamp that can be put into operation when mounted in an existing luminaire designed for a fluorescent lamp.

There are LED lamps on the market shaped like fluorescent tubes that can be placed in an existing luminaire. However, the existing luminaire must be stripped of the ballast and rewired to directly connect the LED lamp to a mains power supply without the intervention of a ballast. The labor required for the stripping and rewiring the luminaire negates much of the savings involving in switching to LED lighting, or even presents higher costs.

Consequently, a LED replacement lamp that does not require modification of the luminaire is preferred. As users usually do not know what kind of the ballast is used in a luminaire, an LED replacement lamp, when inserted in the lamp holder of the luminaire, should operate normally and properly under the influence of a magnetic or electronic ballast.

SUMMARY OF THE INVENTION

In an embodiment of the present invention, an LED lamp arrangement is adapted to replace a fluorescent lamp in a luminaire having a ballast for supplying power to the fluorescent lamp. The LED lamp arrangement has a rectifier, a plurality of LEDs, a LED driver, an impedance balance circuit and a line-voltage controller. The rectifier has two inputs capable of being connected to the ballast. The rectifier provides a rectified power line and a ground power line. The plurality of LEDs and the LED driver are connected in series between the rectified power line and the ground power line. The LED driver regulates a LED driving current through the LEDs. The impedance balance circuit is configured to be coupled between the inputs. The line-voltage controller controls the impedance balance circuit in response to a line voltage at the rectified power line, so as to tune an impedance between the inputs and make the line voltage approach to a predetermined target voltage. The LEDs has a forward voltage less than the predetermined target voltage.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The invention can be more fully understood by the subsequent detailed description and examples with references made to the accompanying drawings, wherein.

DETAILED DESCRIPTION

The following embodiments are described in sufficient detail to enable those skilled in the art to make and use the invention. It is to be understood that other embodiments would be evident based on the present disclosure, and that improves or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known configurations and process steps are not disclosed in detail.

Figure 1A:
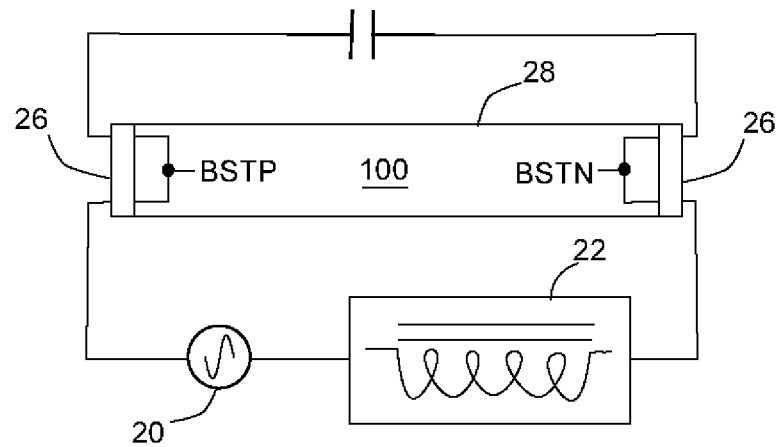
FIGS. 1A and 1B demonstrate two configurations when an LED lamp arrangement according to embodiments of the invention is inserted in the luminaires with magnetic and electronic ballasts respectively.
Figure 1B:
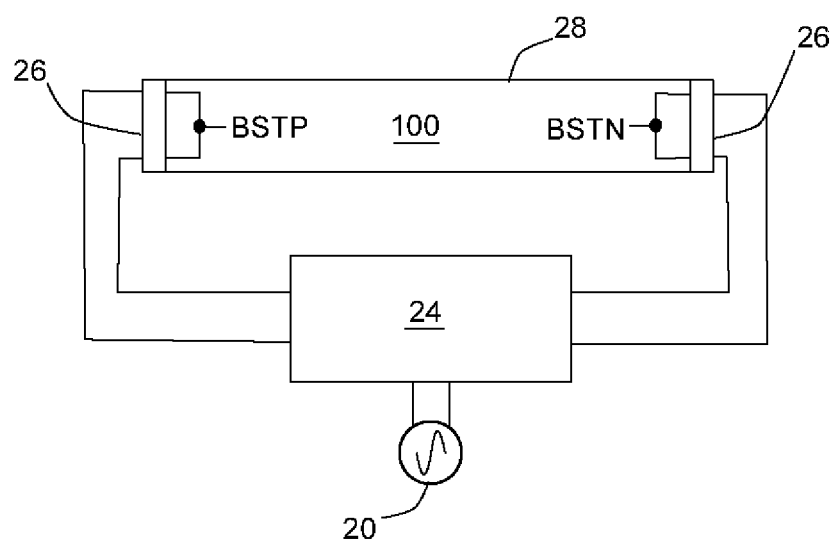

FIGS. 1A and 1B demonstrate possible configurations when an LED lamp arrangement 100 according to embodiments of the invention is inserted in the luminaires with magnetic and electronic ballasts respectively. In FIG. 1A, a magnetic ballast 22 is placed in series with a mains power supply 20 to the LED lamp arrangement 100. In FIG. 1B, an electronic ballast 24 converts AC power from a mains power supply 20 to power the LED lamp arrangement 100. The LED lamp arrangement 100 might have the same exterior of a conventional fluorescent lamp, and each double-pined end cap 26 in FIGS. 1A and 1B has its two pins shorted to each other inside a tube 28. Therefore, these two double-pined end caps 26 are deemed to provide two inputs BSTN and BSTP inside the tube 28 respectively.

Figure 2:
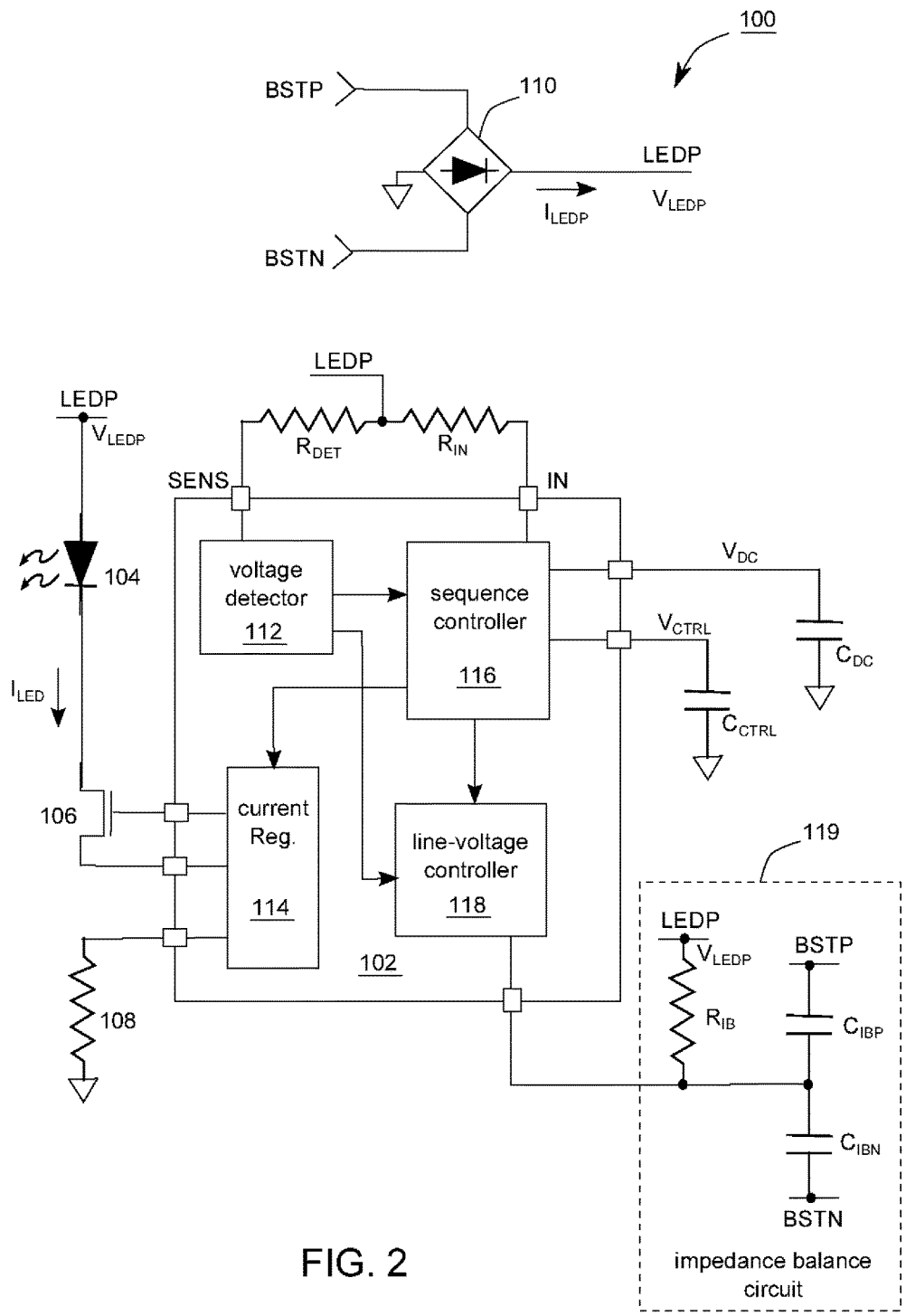
FIG. 2 demonstrates a schematic circuit of an LED lamp arrangement according to embodiments of the invention.

FIG. 2 demonstrates a schematic circuit of the LED lamp arrangement 100 according to embodiments of the invention. The devices shown in FIG. 2 might be all sealed inside the tube 28 to avoid users from touch and electric shock. The LED lamp arrangement 100 has a rectifier 110, an integrated circuit 102 possibly formed on a packaged chip, LEDs 104, a power transistor 106, current-sense resistor 108, detection resistor $R_{DET}$, current-limiting resistor $R_{IN}$, capacitors $C_{DC}$ and $C_{CTRL}$ and impedance balance circuit 119 with redundant resistor $R_{IB}$ and capacitors $C_{IBP}$ and $C_{IBN}$.

The rectifier 110 could be a full-bridge or half-bridge rectifier, providing rectified power line LEDP and a ground power line. When the inputs BSTP and BSTN are connected to the outputs of a well-powered ballast, the rectifier 110 rectifies the AC voltage between inputs BSTP and BSTN and generates a DC line voltage $V_{LEDP}$ and a ground voltage at the rectified power line LEDP and the ground power line respectively. To facilitate explanation, the ground voltage is deemed to be 0V and the line voltage $V_{LEDP}$ is positive in this specification. If the rectifier 110 receives an AC voltage from a magnetic ballast, the AC voltage between inputs BSTP and BSTN could be of a frequency as low as 100 hz. Otherwise, if generated from an electronic ballast, the AC voltage could be of a high frequency ranging from 30,000 hz to 50,000 hz. It is preferable that the rectifier 110 employs diodes with reverse recovery time shorter than 1u second.

The integrated circuit 102 includes a current regulator 114, a voltage detector 112, a sequence controller 116, and a line-voltage controller 118, all integrated on a chip. Through pins, the integrated circuit 102 is connected to external devices and power lines, such as the power transistor 106, the resistor 108, and the ground power line, as demonstrated in FIG. 2.

Figure 3:
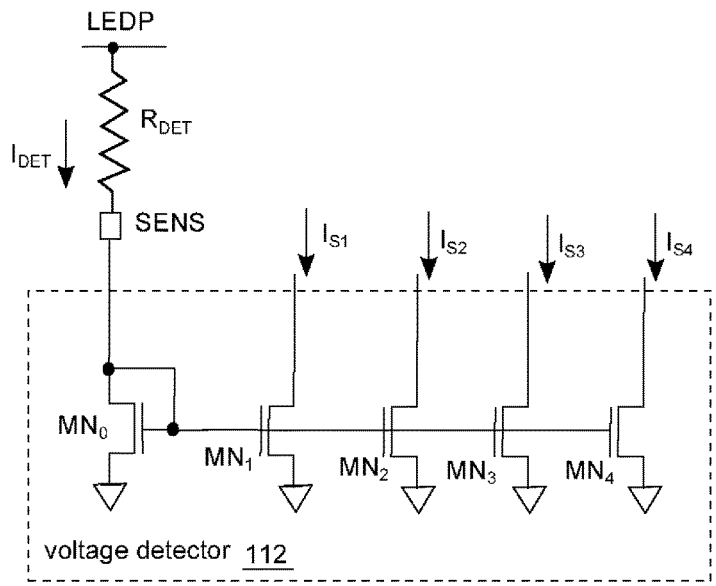
FIG. 3 demonstrates a voltage detector in connection with a detection resistor.

FIG. 3 demonstrates the voltage detector 112 and the detection resistor $R_{DET}$ connected to each other via the pin SENS. The voltage detector 112 is in configuration of a current mirror. Shown in FIG. 3, the voltage detector 112 has an N-type MOS transistor $MN_0$ configured as a MOS diode to detect current $I_{DET}$ flowing from the rectified power line LEDP through the detection resistor $R_{DET}$. Accordingly the voltage detector 112 generates mapping currents $I_{S1}$, $I_{S2}$, $I_{S3}$ . . . in proportion to the current $I_{DET}$. The magnitude IDET of the current $I_{DET}$ can be roughly derived by the following equation, "IDET=$(V_{LEDP}-V_{TH-MN0})$/RDET", where $V_{TH-MN0}$ is the threshold voltage of N-type MOS transistor $MN_0$, and RDET the resistance of the detection resistor $R_{DET}$. The mapping current $I_{S1}$, for example, could be $K_{S1}$*IDET, where $K_{S1}$ is the weighting factor of the mapping current $I_{S1}$ over the current $I_{DET}$. In other words, the voltage detector 112 detects the line voltage $V_{LEDP}$ via the detection resistor $R_{DET}$ to generate the mapping currents $I_{S1}$, $I_{S2}$ and $I_{S3}$.

Figure 4:
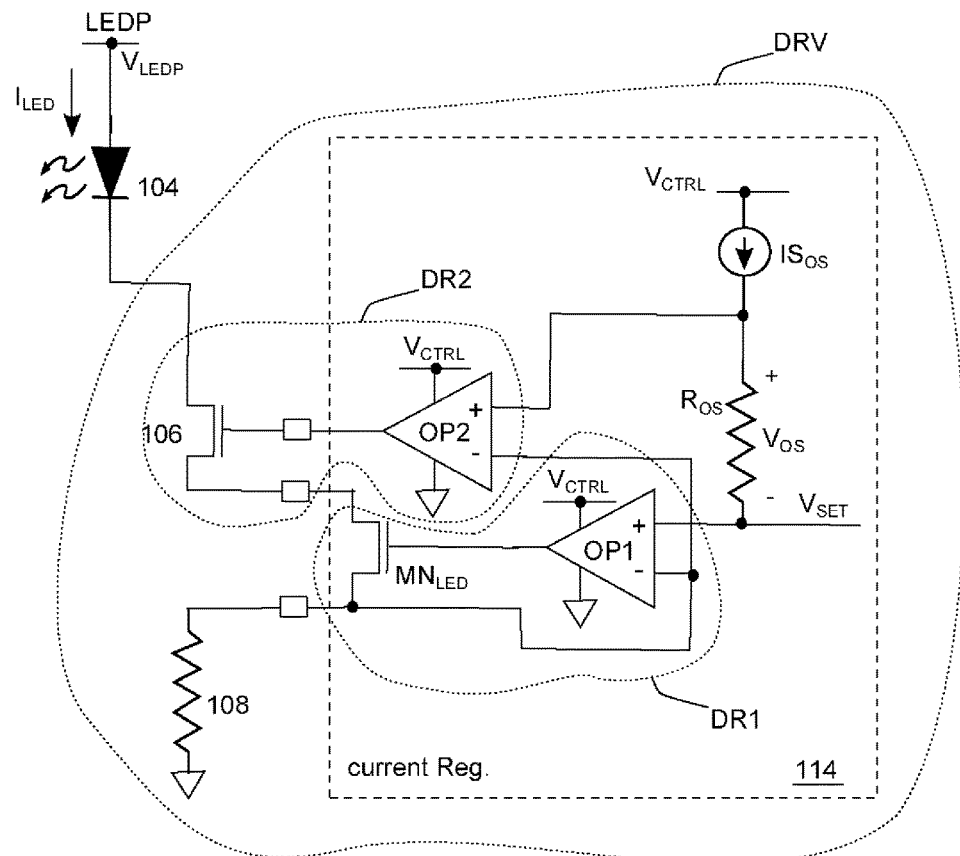
FIG. 4 demonstrates a current regulator, together with a power transistor and a current-sense resistor.

FIG. 4 demonstrates the current regulator 114, together with power transistor 106 and current-sense resistor 108, acting in a whole as a LED driver DRV to provide and regulate a LED driving current $I_{LED}$ through the LEDs 104. The current regulator 114 has operational $MN_{LED}$ amplifiers OP1 and OP2, connected to control power transistors and 106 respectively, in response to the voltage across the current-sense resistor 108. Shown in FIG. 4, the current regulator 114 is powered by an operational voltage $V_{CTL}$, which will be detailed later. An offset resistor $R_{OS}$ and a current source $IS_{OS}$ are connected to provide an offset voltage $V_{OS}$ between the non-inverted input of the operational amplifier OP1 and the non-inverted input of the operational amplifier OP2, as shown in FIG. 4, where a setting voltage $V_{SET}$ is provided to the operational amplifier OP1. It is derivable from FIG. 4 that the operational amplifier OP1 and the power transistor $MN_{LED}$ perform in combination as a constant-current driver DR1, configured to regulate the LED driving current $I_{LED}$ at a constant IC1 equal to the setting voltage $V_{SET}$ divided by the resistance of current-sense resistor 108. Similarly, the operational amplifier OP2 and the power transistor 106 are deemed together as another constant-current driver DR2 configured to regulate the LED driving current $I_{LED}$ at another constant IC2, which however is slightly larger than the constant IC1 due to the existence of the offset voltage $V_{OS}$. The constant-current driver DR1 has a wider closed-loop bandwidth in comparison with the constant-current driver DR2, or the constant-current driver DR1 responses quicker than the constant-current driver DR2. The constant-current driver DR1 will dominate the current control to the LED driving current $I_{LED}$ since the constant IC1 is less than the constant IC2. The constant-current driver DR2, connected between the LEDs 104 and the constant-current driver DR1, could nevertheless prevent any rush current short through to the downstream power transistor $MN_{LED}$ during a startup or when the line voltage $V_{LEDP}$ varies violently.

Figure 5:
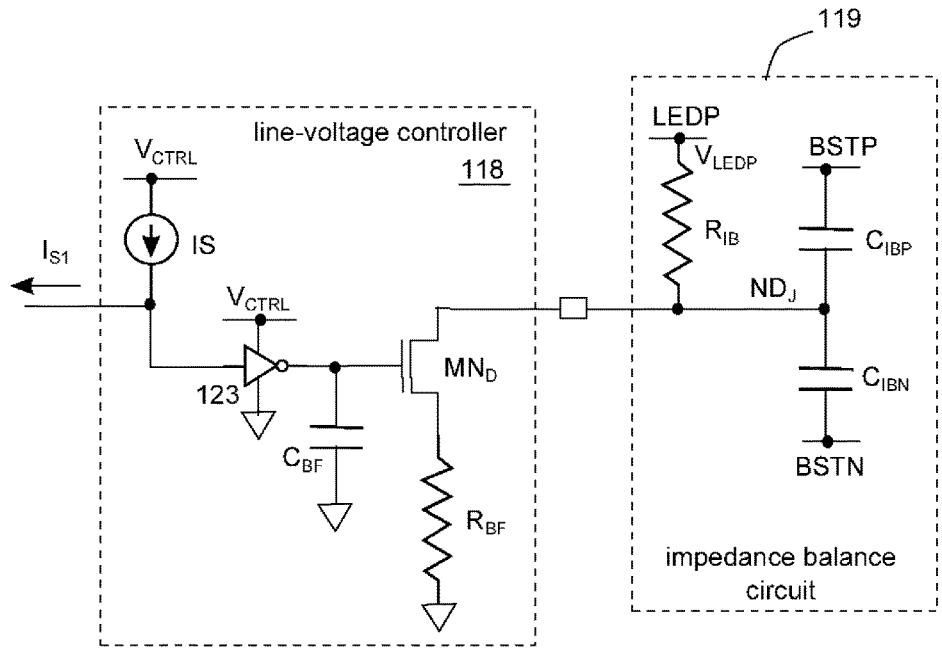
FIG. 5 demonstrates a line-voltage controller in connection with an impedance balance circuit.

FIG. 5 demonstrates the line-voltage controller 118 in connection with the impedance balance circuit 119. Shown in FIG. 5, the impedance balance circuit 119 has the capacitors $C_{IBP}$ and $C_{IBN}$, and the redundant resistor $R_{IB}$. The capacitors $C_{IBP}$ and $C_{IBN}$ are connected to each other by the joint $ND_J$ and in series between the inputs BSTP and BSTN, while the redundant resistor $R_{IB}$ is connected between the rectified power line LEDP and the joint $ND_J$. The line-voltage controller 118 provides and controls a connection between the joint $ND_J$ and the ground power line. The line-voltage controller 118 has a current source IS powered by the operational voltage $V_{CTL}$, and the current source IS is connected to the transistor $MN_1$ in FIG. 3 that drains the mapping current $I_{S1}$. An inverter buffer 123 is connected between a NMOS transistor $MN_D$ and the current source IS. If the current provided by the current source IS exceeds the mapping current $I_{S1}$, the voltage at the control node of the NMOS transistor $MN_D$ ramps down over time. In the opposite, if the current provided by the current source IS is less than the mapping current $I_{S1}$, the voltage at the control node of transistor $MN_D$ rises over time. The line-voltage controller 118 compares the mapping current $I_{S1}$ with the current output from the current source IS to control the impedance balance circuit 119.

As aforementioned, the mapping currents $I_{S1}$ is $K_{S1}$*IDET, and IDET is $(V_{LEDP}-V_{TH-MN0})$/RDET. If the mapping current $I_{S1}$ is equal to the current source IS, the line voltage $V_{LEDP}$ must meet the following equation, "$K_{S1}$* $(V_{LEDP}-V_{TH-MN0})$/RDET=IS". The line-voltage controller 118 seemingly detects the line voltage $V_{LEDP}$ by way of the voltage detector 112, and compares it with a predetermined target voltage, "IS*RDET/$K_{S1}+V_{TH-MN0}$", so as to control the impedance balance circuit 119.

The transistor $MN_D$ provides a connection between the ground power line and the joint $ND_J$, and the voltage at the control node of the transistor $MN_D$ tunes the impedance of the connection. Supposed that the line voltage $V_{LEDP}$ exceeds the predetermined target voltage, the voltage at the control node of the transistor MN1 ramps up, so the impedance between the joint $ND_J$ and the ground power line decreases, the impedance between the inputs BSTP and BSTN reduces, the amplitude of the AC voltage between the inputs BSTP and BSTN ramps down, the line voltage $V_{LEDP}$ at the rectified power line LEDP goes downward. Only when the line voltage $V_{LEDP}$ becomes less than the predetermined target voltage does the inverter buffer 123 start reducing the voltage at the control node of the NMOS transistor $MN_D$. Overtime, the line voltage $V_{LEDP}$ will converge at the predetermined target voltage. Therefore, the line-voltage controller 118 controls the impedance balance circuit 119 in response to the line voltage $V_{LEDP}$, so as to tune an impedance between the inputs BSTP and BSTN and make the line voltage $V_{LEDP}$ approach to the predetermined target voltage.

Shown in FIG. 5, the impedance balance circuit 119 has the capacitors $C_{IBP}$ and $C_{IBN}$ and the redundant resistor $R_{IB}$. This invention is not limited however. In one embodiment of the invention, the impedance balance circuit 119 could have the capacitors $C_{IBP}$ and $C_{IBN}$, but lacks the redundant resistor $R_{IB}$. In another embodiment of the invention, the impedance balance circuit 119 could have the redundant resistor $R_{IB}$, but lacks the capacitors $C_{IBP}$ and $C_{IBN}$.

Figure 6:
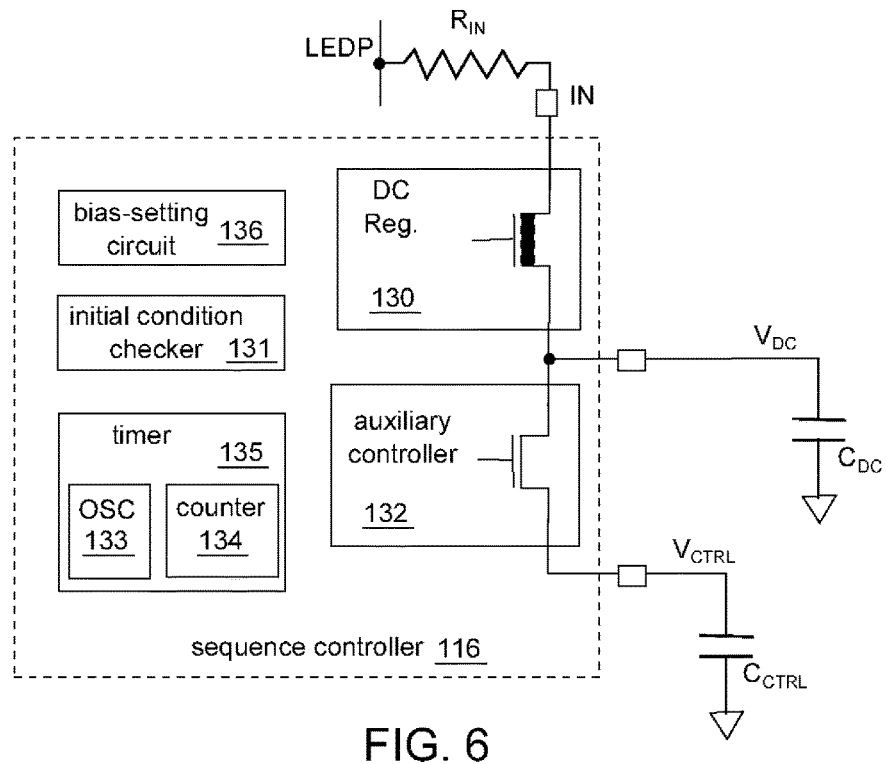
FIG. 6 demonstrates a sequence controller.

FIG. 6 demonstrates the sequence controller 116 including an initial condition checker 131, a bias-setting circuit 136, a direct-current (DC) regulator 130 connected between the current-limiting resistor $R_{IN}$ and the capacitor $C_{DC}$, an auxiliary controller 132 connected between the capacitors $C_{DC}$ and $C_{CTRL}$, and a timer 135.

The DC regulator 130 drains current from the rectified power line LEDP through the current-limiting resistor $R_{IN}$ to charge the capacitor $C_{DC}$ and to regulate an operational voltage $V_{DC}$ on the capacitor $C_{DC}$. For example, the DC regulator 130 has a depletion-mode NMOS transistor, whose gate is initially shorted to the ground power line, so the depletion-mode NMOS transistor is automatically turned OFF when the operational voltage $V_{DC}$ rises to about 5V. The operational voltage $V_{DC}$ is the power source for the initial condition checker 131, the timer 135 and the bias-setting circuit 136.

The bias-setting circuit 136 might include a bandgap reference circuit to provide predetermined reference voltages and currents used for setting bias conditions in some internal circuits when the operational voltage $V_{DC}$ is stable at 5V.

The initial condition checker 131 is coupled to the voltage detector 112, for comparing the line voltage $V_{LEDP}$ with an initial voltage, which might be determined by the detection resistor $R_{DET}$ and a reference current from the bias-setting circuit 136. For example, the initial condition checker 131 compares the line voltage $V_{LEDP}$ with 50V, and if the line voltage $V_{LEDP}$ has exceeded 50V, it signals the timer 135.

The timer 135 has an oscillator 133 and a counter 134, for timing a predetermined period as a delay. After signaled by the initial condition checker 131, the oscillator 133 starts oscillating, and the counter 134 counts accordingly to determine whether the predetermined period elapses. If the predetermined period has passed, the timer 135 signals the auxiliary controller 132. This predetermined period could be 0.5 s, for example.

The auxiliary controller 132 controls the connection between the capacitors $C_{DC}$ and $C_{CTRL}$, and is capable of controlling the ramp-up rate of the operational voltage $V_{CTRL}$ on the capacitor $C_{CTRL}$, where the operational voltage $V_{CTRL}$ powers the current regulator 114 (a part of the LED driver DRV) and the line-voltage controller 118. Initially, the operational voltage $V_{CTRL}$ is 0V. After signaled by the timer 135, the auxiliary controller 132 starts charging the capacitor $C_{CTRL}$ by turning ON a switch between the capacitors $C_{DC}$ and $C_{CTRL}$, and the operational voltage $V_{CTRL}$ ramps up accordingly while the ramp-up rate is under control. In one embodiment, it takes 1 sec for the operational voltage $V_{CTRL}$ to reach 5V from 0V, and the LED driver DRV in FIG. 4 and the line-voltage controller 118 in FIG. 5 starts their normal operations when the operational voltage $V_{CTRL}$ is about 5V.

Figure 7:
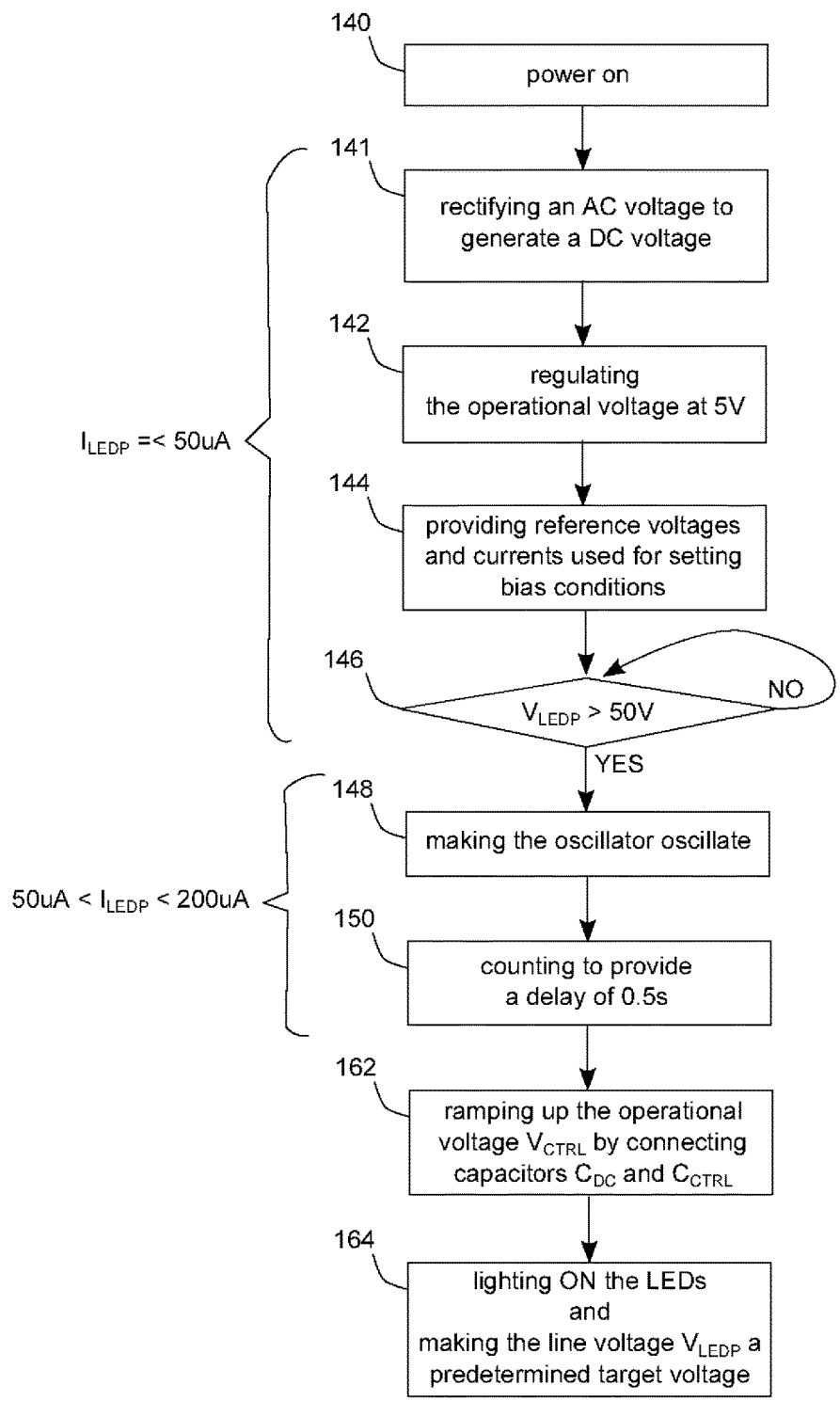
FIG. 7 shows a control method used by the LED lamp arrangement in FIGS. 1A and 1B.

FIG. 7 shows a control method 180 used by the LED lamp arrangement 100 in FIGS. 1A and 1B. Please also take reference to FIGS. 1A, 1B, and 2-6.

Step 140 starts powering a luminaire with the LED lamp arrangement 100 and a ballast, electronic or magnetic, by connecting the luminaire to mains power supply 20, which provides an AC voltage between inputs BSTP and BSTN.

In step 141, the rectifier 110 rectifies to generate a DC line voltage $V_{LEDP}$ and a ground voltage at the rectified power line LEDP and the ground power line respectively. Meanwhile, the integrated circuit 102 keeps the power transistor 106 OFF, and operational voltages $V_{DC}$ and $V_{CTRL}$ are about 0V.

In step 142, the DC regulator 130 starts draining current from the rectified power line LEDP to charge the capacitor $C_{DC}$ and to regulate the operational voltage $V_{DC}$ at 5V.

When the operational voltage is about 5V, the bias-setting circuit 136 starts providing predetermined reference voltages and currents used for setting bias conditions in step 144.

In step 146, as bias conditions has been set up, the initial condition checker 131 compares the line voltage $V_{LEDP}$, with an initial voltage, which is 50V for example in the following embodiments. A properly-powered ballast, whether it is electronic or magnetic, should provide an AC voltage with an amplitude over 100V to the inputs BSTN and BSTP of the rectifier 110, so step 146 confirms whether the ballast has started powering the LED lamp arrangement 100. Step 146 repeats if the line voltage $V_{LEDP}$ is below 50V. Otherwise the initial condition checker 131 signals the timer 135, proceeding step 148.

Please note that in steps 140, 141, 142, 144 and 146, the LEDs do not light, and the integrated circuit 102 preferably limits the consumption current $I_{LEDP}$ output from the rectifier 110 no more than 50 uA.

After signaled by the initial condition checker 131, step 148 starts the oscillator 133 oscillating, and step 150 starts the counter 134 counting to time a predetermined period, which is a 0.5 s for example in the following description. Steps 148 and 150 provide a delay of 0.5 s, in other words.

Steps 148 and 150 keep the consumption current $I_{LEDP}$ in a range of 70 uA to 200 uA while the LEDs 104 do not light. In other words, the LED lamp arrangement 100 consumes more than 50 uA but less than 200 uA within the 0.5 s after the line voltage $V_{LEDP}$ reaches 50V. This constraint in current consumption could help avoiding the triggering of short or open circuit protection provided by some advanced electronic ballasts. An electronic ballast might check in the beginning whether its output current is too small, and shut down its output voltage and current if the answer is positive, so as to provide open circuit protection. Similar with the open circuit protection, short circuit protection means shutting down the output voltage and current of an electronic ballast when finding in the beginning its output current too much. It is believed that most electronic ballasts verify their output current within 0.5 s after power-up, to determine whether to trigger open or short circuit protection, and that the consumption current $I_{LEDP}$, if limited between 70 uA to 200 uA, will not trigger open or short circuit protection of most electronic ballasts. In some other embodiments, this delay of 0.5 s and the range of 70 uA to 200 uA might change to be other values.

In step 162, the auxiliary controller 132 starts connecting capacitor $C_{CTRL}$ with capacitor $C_{DC}$, and limiting the ramp-up rate of the operational voltage $V_{CTRL}$. For example, it takes at least several milliseconds for the operational voltage $V_{CTRL}$ to reach 5V from 0V.

In step 164, the LED driver DRV in FIG. 4 and the line-voltage controller 118 in FIG. 5 starts operating.

Soft startup could be introduced into the operation of the LED driver DRV in FIG. 4. For example, the setting voltage $V_{SET}$ in FIG. 4 might take 1 sec to rise from 0V to its target value, 0.5V for example, while the operational amplifiers OP1 and OP2 well control the power transistors 106 and MN LED respectively. The LEDs 104, as a result, is slowly turned ON because the LED driving current $I_{LED}$ is 0 A in the beginning and increases gradually to reach its default value one second after the operational voltage $V_{CTRL}$ is 5V.

As the operational voltage $V_{CTRL}$ reaches 5V, the line-voltage controller 118 starts controlling the impedance balance circuit 119 to make the line voltage $V_{LEDP}$ the predetermined target voltage. For example, in one embodiment, the forward voltage of the LEDs 104 is 140V, and the predetermined target voltage 130V, meaning the line voltage $V_{LEDP}$ is regulated by the line-voltage controller 118 to be about 130V. Without the line-voltage controller 118 and the impedance balance circuit 119, the line voltage $V_{LEDP}$ could be as high as 200V or more, and much wasted heat and energy will be generated by the power transistors 106 and due to the high voltage drop $MN_{LED}$ across them. When the line voltage $V_{LEDP}$ is regulated by the line-voltage controller 118 and the impedance balance circuit 119 to be slightly above the forward voltage of the LEDs 104, the power transistors 106 and $MN_{LED}$ produce less heat, and the LEDs 104 is driven efficiently.

The LED lamp arrangement 100 according to the embodiments of the invention is suitable to replace a fluorescent lamp in a luminaire having a ballast for supplying power to the fluorescent lamp, no matter whether the ballast is electronic or magnetic. The constraint on the consumption current $V_{LEDP}$ during the delay of 0.5 sec provided by the timer 135 helps avoid triggering the short or open circuit protection of an electronic ballast. The line voltage $V_{LEDP}$ could be regulated at a voltage slightly higher than the forward voltage of the LEDs 104, so the LEDs 104 is driven efficiently.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light emitting diode (LED) lamp arrangement adapted to replace a fluorescent lamp in a luminaire having a ballast for supplying power to the fluorescent lamp, the LED lamp arrangement comprising:
    a rectifier having two inputs configured to be connected to the ballast, the rectifier providing a rectified power line and a ground power line;
    a plurality of LEDs and a LED driver connected in series between the rectified power line and the ground power line, wherein the LED driver regulates a LED driving current through the LEDs;
    an impedance balance circuit configured to be coupled between the inputs;
    a line-voltage controller for controlling the impedance balance circuit in response to a line voltage at the rectified power line, so as to tune an impedance between the inputs and make the line voltage approach to a predetermined target voltage; and
    a timer for delaying start of operation of the line-voltage controller by a predetermined period after the line voltage reaches a predetermined value;
    wherein the LEDs have a forward voltage less than the predetermined target voltage.

2. The LED lamp arrangement of claim 1, wherein the impedance balance circuit includes two capacitors connected in series between the inputs, a joint connects the two capacitors, and the line-voltage controller controls a connection between the joint and the ground power line to tune the impedance between the inputs.

3. The LED lamp arrangement of claim 1, wherein the impedance balance circuit includes a redundant resistor connected to the rectified power line, and the line-voltage controller controls a connection between the redundant resistor and the ground power line to tune the impedance between the inputs.

4. The LED lamp arrangement of claim 1, further comprising:
    a voltage detector; and
    a detection resistor connected between the rectified power line and the voltage detector, wherein the voltage detector detects the line voltage via the detection resistor;
    wherein the line-voltage controller is connected to the voltage detector for comparing the line voltage with the predetermined target voltage to control the impedance balance circuit.

5. The LED lamp arrangement of claim 1, wherein the LED driver comprises:
- a first constant-current driver for controlling a LED driving current through the LEDs, wherein the first constant-current driver is configured to regulate the LED driving current at a first constant value; and
- a second constant-current driver for controlling the LED driving current, wherein the second constant-current driver is configured to regulate the LED driving current at a second constant value larger than the first constant value;
- wherein the second constant-current driver is connected between the LEDs and the first constant-current driver.

6. The LED lamp arrangement of claim 1, further comprising:
- a current-limiting resistor;
- a direct-current regulator connected to the rectified power line through the current-limiting resistor;
- a first capacitor, wherein the direct-current regulator regulates a first operational voltage on the first capacitor, wherein the timer is powered by the first operational voltage, for timing the predetermined period after operational voltage has reached a first reference voltage;
- a second capacitor; and
- an auxiliary controller for charging the second capacitor after the predetermined period elapses;
- wherein the second capacitor provides a second operational voltage to power the line-voltage controller and the LED driver.

7. The LED lamp arrangement of claim 6, wherein the line-voltage controller, the direct-current regulator, the timer, and the auxiliary controller are integrated in an integrated circuit on a chip.

8. The LED lamp arrangement of claim 6, further comprising:
- an initial condition checker, for comparing the line voltage with an initial voltage;
- wherein the initial condition checker signals the timer to start timing the predetermined period when the line voltage exceeds the initial voltage.

9. The LED lamp arrangement of claim 1, wherein the LEDs has a forward voltage less than the predetermined target voltage.

10. A control method for lighting light emitting diodes (LEDs) in a LED lamp arrangement adapted to replace a fluorescent lamp in a luminaire having a ballast for supplying power to the fluorescent lamp, wherein the LED lamp arrangement has two inputs configured to be connected to the ballast, the control method comprising:
- rectifying an alternating-current voltage between the inputs to provide a rectified power line and a ground power line;
- regulating a LED driving current through the LEDs, wherein the LEDs is connected between the rectified power line and the ground power line;
- detecting a line voltage at the rectified power line; and
- utilizing a timer to constrain consumption current of the LED lamp arrangement to be within a predetermined range for a predetermined period after the line voltage reaches a predetermined value before tuning an impedance between the inputs to make the line voltage approach to a predetermined target voltage.

11. The control method of claim 10, comprising:
- providing two capacitors connected in series between the inputs, wherein a joint connects the two capacitors; and
- controlling a connection between the joint and the ground power line to tune the impedance between the inputs.

12. The control method of claim 10, comprising:
- providing a redundant resistor connected to the rectified power line; and
- controlling a connection between the redundant resistor and the ground power line to tune the impedance between the inputs.

13. The control method of claim 10, further comprising:
- comparing a line voltage at the rectified power line with an initial voltage; and
- timing a predetermined period when the line voltage exceeds the initial voltage;
- wherein the steps of regulating and tuning start after the predetermined period has elapsed.

14. The control method of claim 13, wherein the step of rectifying employs a rectifier outputting a consumption current, the control method further comprising:
- constraining the consumption current in a predetermined range before the steps of regulating and tuning starts.

* * * * *